United States Patent [19]

Walker

[11] Patent Number: 4,486,947
[45] Date of Patent: Dec. 11, 1984

[54] APPARATUS FOR COILS IN LENGTHY CORES

[75] Inventor: Robert G. Walker, Ossian, Ind.

[73] Assignee: Industra Products, Inc., Fort Wayne, Ind.

[21] Appl. No.: 417,414

[22] Filed: Sep. 13, 1982

[51] Int. Cl.³ .............................................. H02K 15/06
[52] U.S. Cl. ...................................... 29/734; 29/596; 29/736
[58] Field of Search ................... 29/596, 732, 734, 736

[56] References Cited

U.S. PATENT DOCUMENTS 3,689,976  9/1972  Donovan .
4,156,964  6/1979  Walker .

FOREIGN PATENT DOCUMENTS 1421759   1/1976  United Kingdom .
1515477   6/1978  United Kingdom .
2016968B  6/1982  United Kingdom .
2096497A  10/1982 United Kingdom .

Primary Examiner—Carl E. Hall
Attorney, Agent, or Firm—Jeffers, Irish & Hoffman

[57] ABSTRACT

Relatively large coils or windings are positioned in relatively lengthy stator cores with the aid of a coil placing machine by placing coils over certain finger elements of the machine, revolving the set of finger elements and corresponding insulating wedge guides and placing further coils over other of the finger elements. Thereafter, a dynamoelectric machine stator core is positioned in axial alignment with the finger elements with one end face thereof engaging the wedge guide ends and with the finger element free ends just entering the bore of the stator core. A stripper and the plurality of finger elements are moved together along the bore of the core to lead side turn portions of the coils into and along respective core slots whereupon movement of at least some of the finger elements is halted while movement of at least the stripper continues to complete placement of the coils. The process may be implemented by providing a stator support cradle which is movable along an elongated machine bed and supports a fixed generally cylindrical tooling enclosure in general axial alignment with the direction of cradle movement. Coil placer tooling is positioned within the enclosure extending somewhat therefrom toward the cradle to receive the coils and thereafter be extended further from the cradle under the control of a first fixed fluid actuated cylinder. A second fluid actuated cylinder movable with the tooling may be employed to impart the additional movement of a portion only of the tooling to complete the insertion process. An accessory for and method of modifying such a machine so as to adapt it to cores of different axial lengths is also disclosed.

8 Claims, 5 Drawing Figures

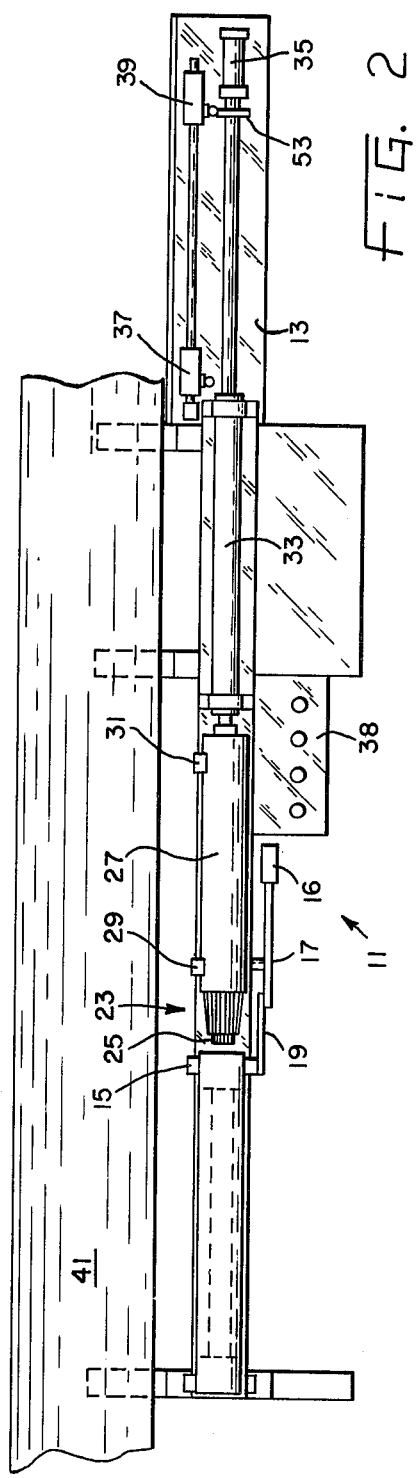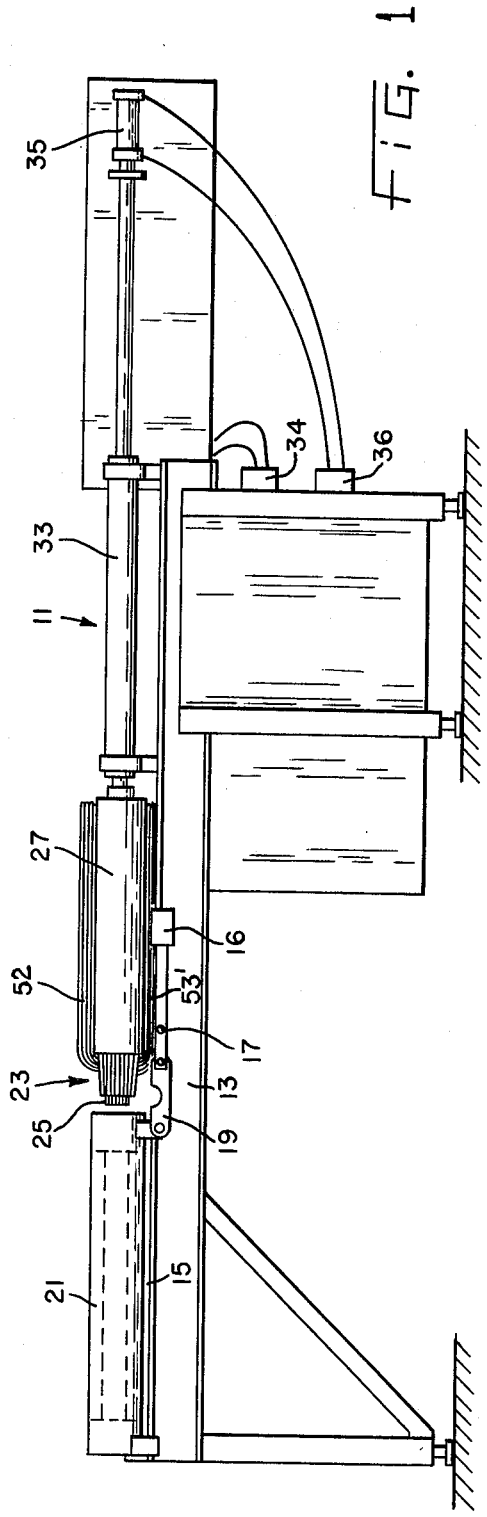

APPARATUS FOR COILS IN LENGTHY CORES

BACKGROUND OF THE INVENTION

The present invention relates generally to the insertion of prewound coils in magnetic cores such as dynamoelectric machine stator cores and more particularly to methods and apparatuses facilitating such insertion in cores having a relatively large stack height to bore diameter ratio.

A number of machines have been devised for inserting prewound coils as well as, optionally, insulating wedges into stator cores as illustrated by the Hill, U.S. Pat. No. 3,324,536 and Walker et al, U.S. Pat. No. 3,402,462. In devices of this type preformed coils, for example formed on winding machines of known types, are placed over appropriate tooling blades or fingers of the placer for subsequent insertion into a stator core. The coils for all of the poles of the dynamoelectric machine to be produced may be placed on the tooling blades and inserted simultaneously or individual coils may be positioned and inserted one at a time if desired. Similarly auxiliary or start windings may be inserted into the magnetic core either one pole at a time or simultaneously and in some instances both the main and start windings along with various insulating wedges may be inserted in stator cores by such machines. These insulators may be to separate one winding from another or to isolate the windings from the stator bore.

Stator cores having a large stack height to bore diameter ratio give rise to special problems in these known processes and devices. Such cores are encountered for example in the case of submersible pump motors where the motor is designed to be assembled with a pump and lowered down the casing of, for example, a water or oil well for the purpose of pumping fluid from that well. Such submersible pump motors will frequently have an axial length several times the stator bore diameter so that the coils for forming the windings are quite large and difficult to handle. This awkward aspect of the coils has frequently necessitated the insertion of coils for but a single pole during each pass of coil placer tooling of the above mentioned type.

A companion problem, in the assembly of relatively lengthy stators is that the insulating wedges are also quite long and difficult to load into the coil placing machine. A further related problem is that the reciprocating stroke of such a coil placing machine is relatively long and difficult to achieve.

Somewhat related to the above noted problems is that fact that the stack height or length of the stator core may vary from one motor design to another and the coil placing machine users, both original equipment manufacturers and ones where the rebuilding or rewinding of such motors takes place, desire that such machines may be relatively easily adapted to stator cores of various lengths.

The prior art technology for stack height adjustment is exemplified by the Walker et al, U.S. Pat. No. 4,156,964 and the serveral prior art techniques discussed therein. Again these known techniques are difficult to implement in machines for positioning coils in cores having a relatively large stack height to bore diameter ratio because of the substantial tooling lengths encountered in such machines.

SUMMARY OF THE INVENTION

Among the several objects of the present invention may be noted the efficient use of a coil placing machine to place relatively large coils in relatively long stator cores; the reduction in the number of coil placing machine operations required to insert the windings in a dynamoelectric machine stator core; the provision of a scheme for adapting a coil placing machine to stator cores of various stack heights; the provision of rotatable coil placer tooling to facilitate easy operator access thereto; and the provision of a method and apparatus for quickly and easily changing the effective length of an arrangement for pushing insulators into a dynamoelectric machine stator core.

In general, a coil placing machine is employed to place relatively large coils in relatively long stator cores by placing coils over certain finger elements of the coil placing machine, revolving the coil placing machine finger elements, placing further coils over other of the finger elements, positioning the core in axial alignment with the finger elements with the finger element free ends just entering the bore of the core, moving a stripper and the plurality of finger elements together along the bore of the core to lead side turn portions of coils into and along respective core slots, and halting movement of at least some of the finger elements while continuing movement of at least the stripper to complete the coil placement.

Also in general and in one form of the invention, a coil placing machine has an axially movable stripper for placing prewound coils in magnetic cores and a plurality of push rods coupled by threaded rods to and movable with the stripper for pushing respective insulating wedges into position in the core. Push rod position is varied to accommodate cores of varying lengths by simultaneously revolving the threaded rods to change the relative axial positions of the stripper and wedge push rods.

Still further in general a coil placing machine has a stator support cradle movable along an elongated machine bed with a generally cylindrical tooling enclosure fixed relative to the bed and having coil placer tooling extending therefrom toward the cradle. A first fluid actuated cylinder, also fixed relative to the bed, moves the tooling from the enclosure toward the cradle while a second fluid actuated cylinder movable generally with the tooling is actuable to impart additional movement to a portion of the tooling relative to the remainder of the tooling.

BRIEF DESCRIPTION OF THE DRAWING

FIG. 1 is a side elevation view of a coil placing machine according to the present invention with windings and a stator core in position preparatory to winding insertion;

FIG. 2 is a plan view of the coil placing machine of FIG. 1;

Corresponding reference characters indicate corresponding parts throughout the several views of the drawing.

Figure 3:
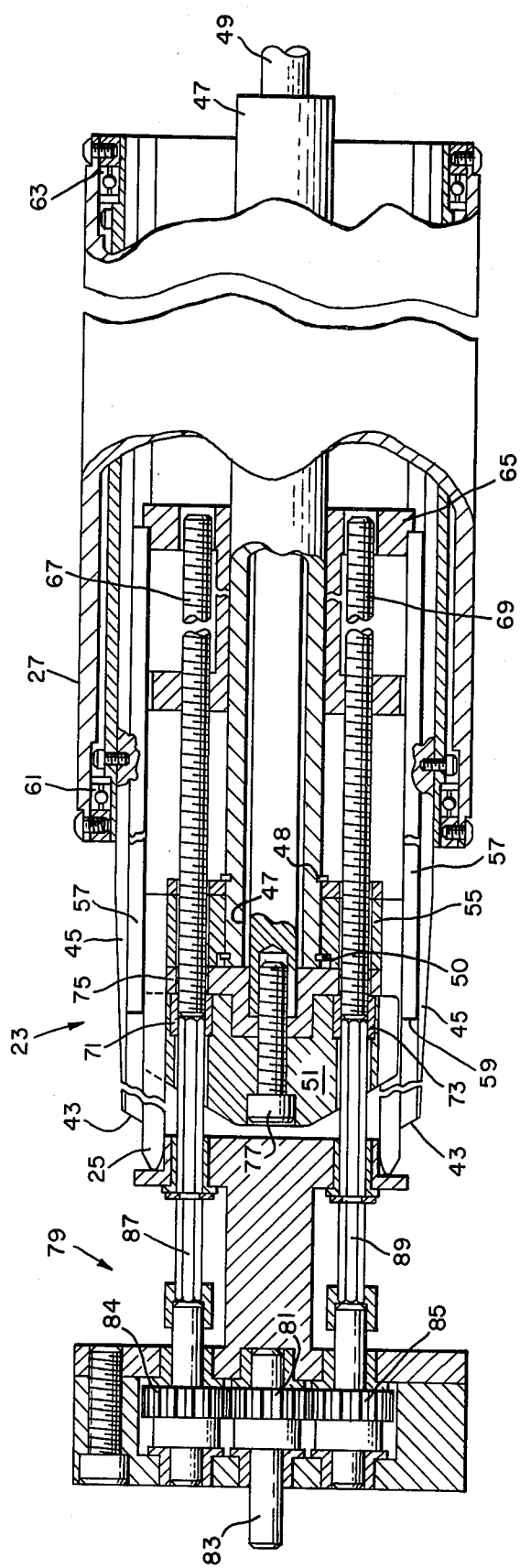
FIG. 3 is a detailed cross-sectional view of the coil placer tooling of FIGS. 1 and 2 with a stack height adjustment tool aligned therewith.

The exemplifications set out herein illustrate a preferred embodiment of the invention in one form thereof and such exemplifications are not to be construed as limiting in any manner the scope of the disclosure of the scope of the invention.

DETAILED DESCRIPTION OF THE PREFERRED EMBODIMENT

Referring first primarily to FIGS. 1 and 2 the coil placing machine 11 is seen to include an elongated machine bed 13 and a stator support cradle 15 which is movable along the bed in the direction of bed elongation under the control of an operator actuable handle 16. Handle 16 is pivotably attached to the bed 17 and coupled by way of pivotable link 19 to the cradle 15. Thus, the operator may stand facing the machine and grasp handle 16 with his right hand rotating that handle in a counterclockwise sense as viewed in FIG. 1 and at the same time grasp the stator 21 supported on cradle 15 and make minor rotational adjustments to the position of stator core 21 as the cradle 15 moves toward the placer tooling 23 so as to properly mate the stator core with the finger elements or blades 25 of the tooling 23 with those blades extending somewhat into the stator core. Thus, approximately one-half revolution of the handle 16 about its pivot 17 is effective to mate the stator and tooling and to separate the stator from the tooling subsequent to the insertion of a coil in that stator core.

The coil placer tooling 23 is nested in and extends somewhat from a generally cylindrical tool enclosure 27 fixed by brackets 29 and 31 to the machine bed. As will be better understood from the discussion of FIG. 3 the coil placing tooling 23 is rotatably supported within the tooling enclosure 27 for rotation about the cylindrical axis of the enclosure.

In axial alignment with cylindrical enclosure 27 are the tooling 23, a first fluid actuated cylinder 33 a second fluid actuated cylinder 35, and, when present, the generally cylindrical bore of the stator core 21. The first fluid actuated cylinder 33 is fixed relative to the bed 13 and, upon actuation, moves the tooling 23 or more particularly a plurality of generally parallel extending finger elements 25 thereof as well as a coil stripper and insulating wedges toward the bore of stator core 21. The second fluid actuated cylinder 35 is moved along with this tooling under the effect of cylinder 33 and, when a desired stroke of cylinder 33 has occurred, cylinder 35 may be actuated to impart an additional fixed movement to the stripper to complete the insertion process. A pair of limit switches 37 and 39 are adjustably located along the bed for sensing the relative axial positions of the several elements making up tooling 23 for controlling the respective movements thereof. Limit switch 37 disables cylinder 33 and actuates cylinder 35. A pair of control valves 34 and 36 actuate cylinders 33 and 35 and an operator control panel 38 is provided. A conveyor 41 supplies magnetic cores to the area of the coil placing machine 11 and conveys dynamoelectric machine stators with windings and insulation inserted therein from the coil placing machine 11.

Referring now to FIG. 1 and FIG. 3 it will be understood that a stator core will be axially aligned with the tooling 23 with the one end face of that core resting against the ends 43 of respective wedge guides 45 preparatory to the winding insertion process. At this time the finger elements 25 extend slightly into the stator core and upon actuation of cylinder 33 the coaxial pair of drive rods 47 and 49 move together, toward the left as viewed, to simultaneously extend the finger elements 25 along the length of the stator core while the stripper 51 moves with those blades to urge the prewound coils 52 into position in the slotted core. When the collar 53 engages limit switch 37 the blades 25 will extend out the opposite end face of the stator core and cylinder 33 will be deactuated halting movement of drive rod 47 and therefor also of the blade support 55. Blade support 55 is engaged by the shoulder 48 of drive rod 47 and held by snap rings 50. Blade support 55 may support the entire plurality of blades 25 or alternate ones of pairs of those blades may be supported on the blade support 55 and stripper 51 as in the Donovan U.S. Pat. No. 3,689,976 as desired. In either case, upon full extension of the blades 25 by cylinder 33, cylinder 35 is actuated to continue by moving drive rod 49 leftwardly as viewed relative to drive rod 47 continuing the movement of stripper 51 and the trailing wedge 57 until the stripper 51 extends beyond the opposite face of the stator core and the ends such as 59 of wedge 57 are extended slightly beyond the face of the stator core. Upon completion of the pass of stripper 51 through the stator bore, cylinder 35 is reversed as is cylinder 33 so as to withdraw the stripper 51 its fixed stroke distance relative to the blade support 55 and to withdraw the blades 25 back to the position illustrated in FIG. 3 whereupon handle 16 is rotated clockwise as viewed in FIG. 1 moving the completed stator leftwardly out of engagement with the tooling 23 for removal from cradle 15 and the subsequent processing of additional stator cores.

As noted earlier the insertion of prewound coils into magnetic cores having large stack height to bore diameter ratio gives rise to numerous complexities not associated with more conventional stator assembly. For example, submersible pump motors may have an outside stator diameter of four or six inches and may extend axially for thirty inches or more. FIG. 3 illustrates the details of one feature of the invention which facilitates the placement of relatively large coils in relatively long stator cores. The cylindrical tooling enclosure 27 supports bearings 61 and 63 which allow the tooling in its entirety including blades 25, wedge guides 45 and wedge push rods 57 to be rotated about the axis of the cylinder so that an operator can easily insert insulting wedges in the wedge guide slots corresponding to the stator slots which are to receive the windings and then position a first winding between appropriate pairs of blades 25 and wedge guides 45 from above as viewed in FIG. 2. The tooling 23 is then rotated on bearings 61 and 63 through, for example, 180° in the case of a two pole stator so that the winding 52 moves to the lower position 53' allowing the operator to, again from above, position the second winding between appropriate blades and wedge guides. Coil insertion then proceeds as previously discussed.

The wedge drive plate 65 threadedly engages a pair of threaded rods 67 and 69 having respective hex drive nuts 71 and 73 captured between stripper 51 and a retaining plate 75 by stripper bolt 77. Thus, when stripper 51 moves, the wedge drive plate 65 moves with it. Simultaneous rotation of the threaded rods 67 and 69 changes the separation between stripper 51 and wedge drive plate 65. This separation is related to stator stack height in that the stripper 51 must pass completely through the stator core while the ends 59 of the wedge drive plates 65 must halt short of the entrance end of the stator core bore. Thus a change in separation between stripper 51 and wedge drive plate 65 corresponds to a change in stator core stack height. This change is accomplished by simultaneously rotating threaded rods 67 and 69 by a stack height adjustment tool 79 as illustrated in FIG. 3.

The stack height adjustment tool 79 includes a drive gear 81 which is operator actuable, for example, by a hand crank attached to shaft 83 or by gripping shaft 83 with the chuck of a conventional reversible variable speed electric drill. Drive gear 81 engages a plurality of driven gears 84 and 85 each coupled to respective drive shafts 87 and 89 with those drive shafts in turn engaging the hex drive nuts 71 and 73 of threaded shafts 67 and 69, respectively. Thus the stack height adjustment tool is merely slid into the position illustrated in FIG. 3 with the respective drive shafts 87 and 89 engaging the nuts 71 and 73 and shaft 83 rotated to threadingly move the plate 65 relative to the threaded rods 67 and 69 with the direction of rotation of shaft 83 determining whether the separation between stripper 51 and the ends 59 of the wedge is to be increased or decreased for correspondingly longer or shorter stator cores. The position of limit switch 37 is correspondingly adjusted so that collar 53 engages that limit switch halting cylinder 33 at the appropriate time when blades 25 have just passed through the stator core. The fixed stroke of cylinder 35 then completes the insertion process.

Figure 4:
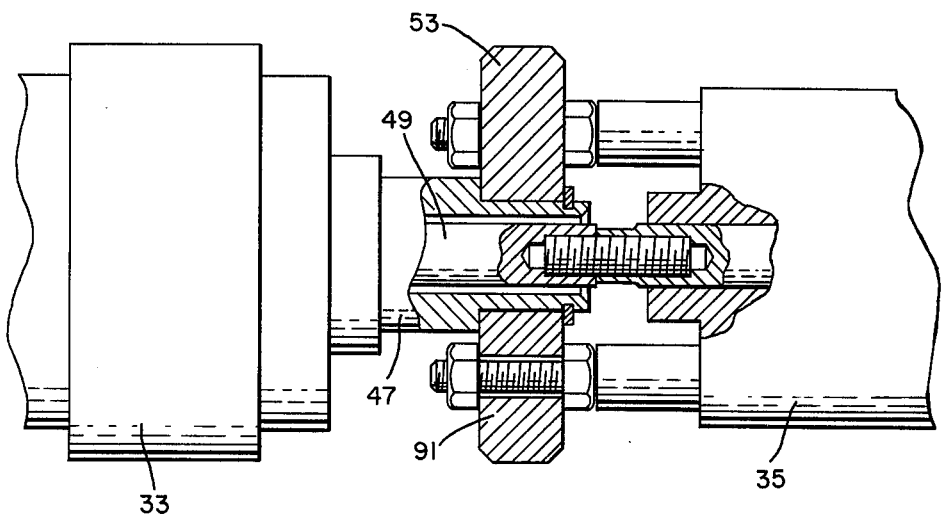
FIG. 4 illustrates the coupling of the actuating cylinders.

The details of the coupling between the two cylinders 33 and 35 is illustrated in FIG. 4 with cylinder 35 being supported in a piggy-back manner on the shaft 47 by a clamping arrangement 91 so that cylinder 35 moves with the shaft 47 and, upon actuation of cylinder 35, the concentrically inner shaft 49 is moved relative to shaft 47. As noted earlier, this fixed relative movement imparts the correspondingly fixed relative movement to stripper 51 relative to part or all of the blades 25. The arrangement illustrated in FIG. 3 has the stripper 51 moving relative to all blades 25 however, as illustrated in FIG. 5 some of the blades may be affixed to the stripper.

Figure 5:
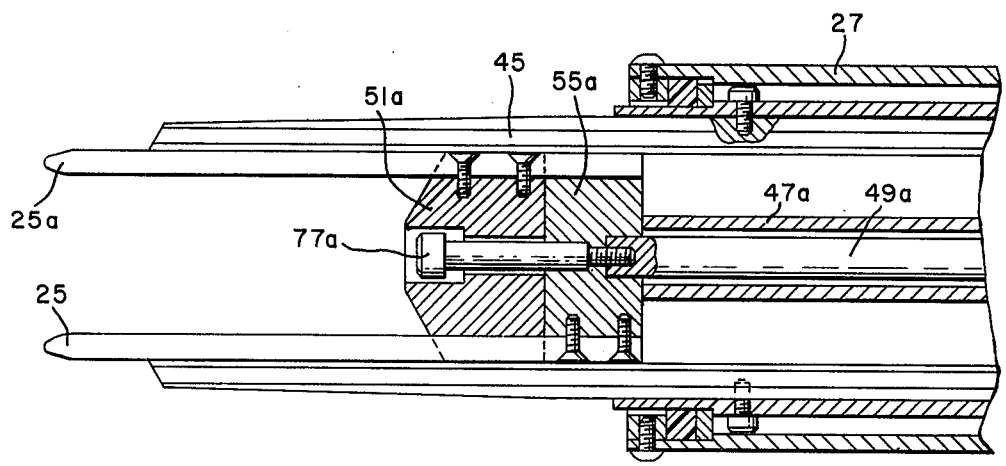
FIG. 5 illustrates a variation on the stripper and blades of FIG. 3.

As illustrated in FIG. 5 alternate ones of adjacent pairs of blades are affixed to the stripper 51a for movement therewith. Thus blade 25a is attached to the stripper while blade 25 is attached to the blade support 55a. With this arrangement all of the blades move together during the insertion step, however it will be noted that the bolt 77a which couples stripper 51a to the drive shaft 49a includes a gap so that, upon initial retraction of the tooling, blade 25 will be withdrawn however blade 25a will remain fixed for a short period of time until the bolt head 77a engages stripper 51a to move blade 25a back out of the stator core. This lost motion between the blades 25 and 25a helps to insure that windings are not jammed between adjacent blades and therefor withdrawn when the tooling is extracted from the stator core. The variation of FIG. 5 may otherwise work much the same as previously discussed but it does function to loosen the coil end turn portions in the region of the adjacent finger elements prior to withdrawing those finger element from the bore of the core.

From the foregoing it is now apparent that a novel coil placing arrangement for facilitating assembly of relatively large coils in relatively long stator cores as well as a novel arrangement for conversion of such a coil placing machine among any one of several different stator core lengths has been disclosed meeting the objects and advantageous features set out hereinbefore as well as other and that modifications as to the precise configurations, shapes, details and steps of the method may be made by those having ordinary skill in the art without departing from the spirit of the invention or the scope thereof as set out by the claims which follow.

What is claimed is:

1. A coil placing machine comprising:
an elongated machine bed;
a stator support cradle movable along the bed;
a generally cylindrical tooling enclosure fixed relative to the bed and generally axially aligned with the direction of the cradle movement;
coil placer tooling having a home position within the enclosure and extending somewhat therefrom toward the cradle;
a first fluid actuated cylinder fixed relative to the bed for moving the tooling from the enclosure toward the cradle and back to its home position; and
a second fluid actuated cylinder movable generally with the tooling and actuable to impart additional movement to a portion of the tooling relative to the remainder of the tooling.

2. The coil placing machine of claim 1 wherein the coil placer tooling includes a plurality of generally parallel extending finger elements for supporting prewound coils and a stripper for engaging and moving the coils into a stator, said portion of the tooling including the stripper.

3. The coil placing machine of claim 2 wherein the first cylinder moves the finger elements and stripper simultaneously while the second cylinder moves the stripper and certain ones only of the finger elements relative to the remaining finger, elements.

4. The coil placing machine of claim 3 further including means operable upon maximum extension of the tooling toward the cradle for imparting a first incremental movement of the remaining finger elements relative to the stripper and certain finger elements to minimize the likelihood of removing placed coils from a stator.

5. The coil placing machine of claim 2 wherein the second cylinder moves the stripper relative to the entire plurality of finger elements.

6. The coil placing machines of claim 1 further including means supporting the tooling for selective rotation relative to the enclosure about the axis thereof to facilitate positioning coils on the tooling.

7. The coil placing machine of claim 6 wherein the coil placer tooling includes a plurality of generally parallel extending finger elements for supporting prewound coils, a stripper for engaging and moving the coils into a stator, a plurality of wedge guides for receiving insulating wedges, and a wedge drive plate for moving insulating wedges from the wedge guides into respective stator core locations with all of the tooling components being selectively rotatable about the enclosure axis and all except the wedge guides being movable along the enclosure axis.

8. The coil placing machine of claim 1 further comprising an operator actuable lever coupled to the cradle for moving the cradle along the bed between a stator receiving position and a position engaging a previously received stator with the tooling.

* * * * *